No. 859,750. PATENTED JULY 9, 1907.
W. H. DAVIS.
LAMPBLACK MACHINE.
APPLICATION FILED FEB. 8, 1907.
2 SHEETS—SHEET 2.
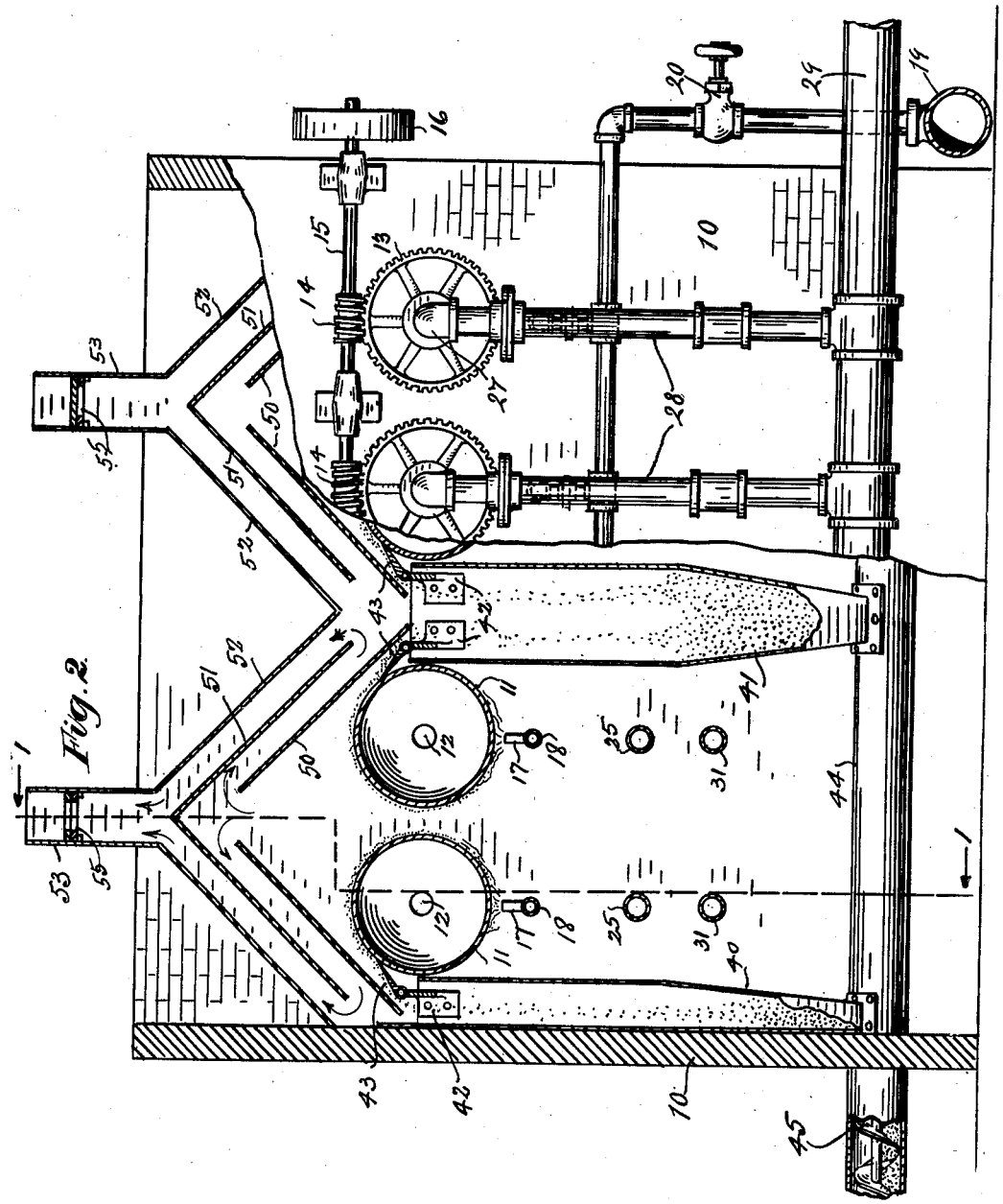
WITNESSES:
N. Allemong.
W. M. Gentle.
INVENTOR.
William H. Davis.
BY
V. H. Lockwood
ATTORNEY.

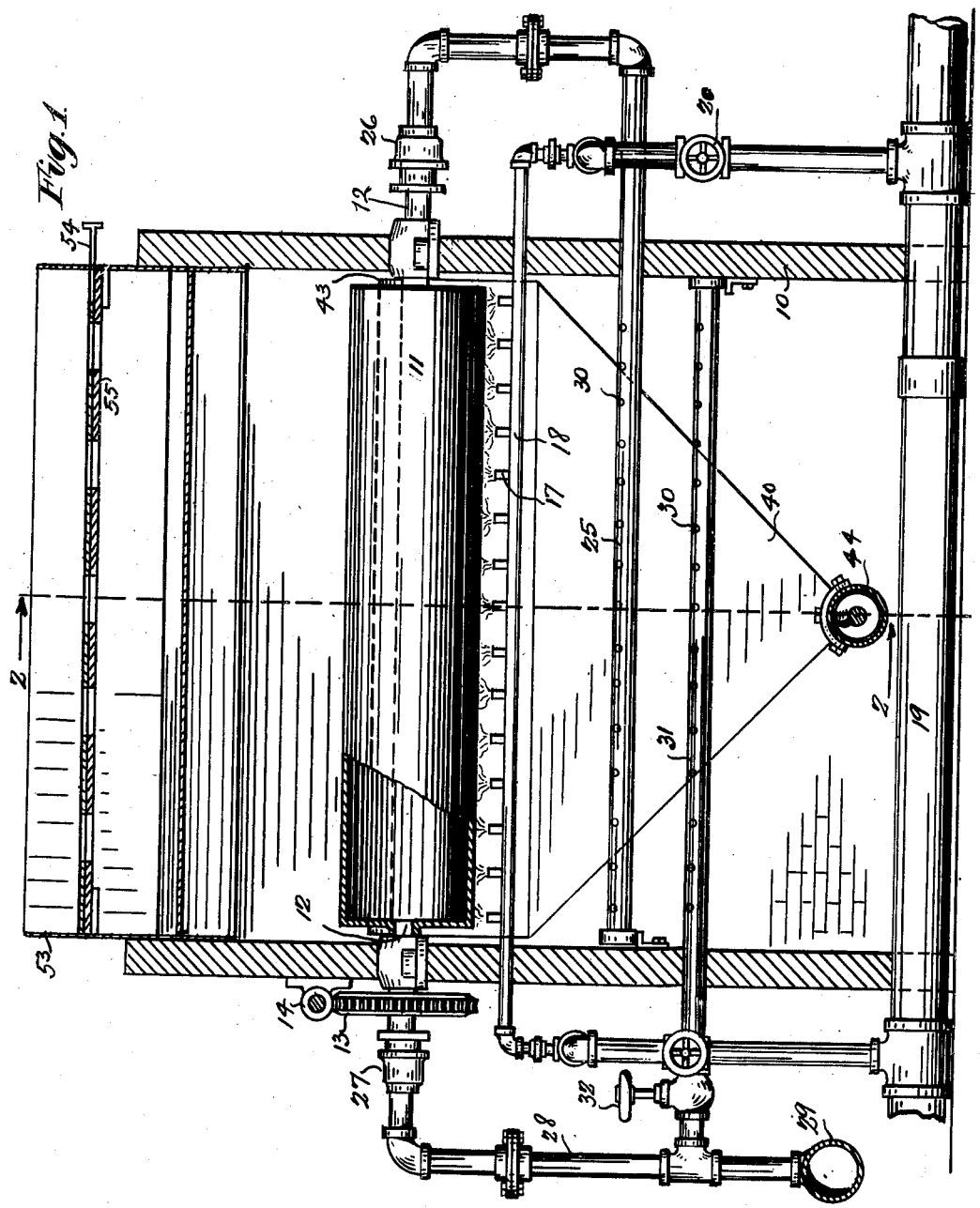

UNITED STATES PATENT OFFICE.

WILLIAM H. DAVIS, OF EATON, INDIANA.

LAMPBLACK-MACHINE.

No. 859,750.     Specification of Letters Patent.     Patented July 9, 1907.

Application filed February 8, 1907. Serial No. 356,371.

*To all whom it may concern:*

Be it known that I, WILLIAM H. DAVIS, of Eaton, county of Delaware, and State of Indiana, have invented a certain new and useful Lampblack - Machine; and I do hereby declare that the following is a full, clear, and exact description thereof, reference being had to the accompanying drawings, in which like letters refer to like parts.

The object of this invention is to improve the construction of machines for making lamp black from natural or other kinds of gas or from oils and other kinds of hydrocarbons.

The chief feature of this invention consists in means for regulating and warming the air supply to the burners so that the quality and amount of carbon deposited will be materially increased.

Another feature of the invention consists in providing carbon collecting hoppers between carbon rollers so the carbon will be scraped from the periphery of said rollers and it will fall into the hopper and be conveyed therefrom.

Another novel feature consists of circuitous means for the outlet of the fumes whereby additional carbon will be deposited on inclined plates whence it will be discharged into said hoppers.

The nature of the invention will be more fully understood from the accompanying drawings and the following description and claims.

In the drawings, Figure 1 is a vertical section through the device on the line 1—1 of Fig. 2. Fig. 2 is a section on the line 2—2 of Fig. 1 excepting a portion of the apparatus which is shown in elevation.

A suitable casing 10 is built of brick or other means within which cylinders 11, four in the machine shown, are mounted, upon which the lamp black is to be first deposited. Said cylinders are hollow and mounted on tubular spindles 12 and driven by gears 13 and worms 14, on the shaft 15 carrying the driving pulley 16.

Within the casing centrally under each cylinder and near the cylinder there is mounted a series of burners 17 extending upward from a horizontal gas pipe 18 leading from the fuel supply pipe 19 and controlled by the valves 20. The flames from the burner 17 contact with the cylinder and deposit upon it the carbon.

The carbon created by mechanism of this sort varies in quality and amount according to the condition of the air supplied to the burners. I locate some distance below the row of burners a warm air pipe 25 communicating, by a stuffing-box 26, with a hollow cylinder 11 which in turn communicates through a stuffing-box 27 with a pipe 28 leading from a pipe 29 through which air is supplied under pressure. The pipe 25 has a number of holes 30 on the upper side thereof and the series of holes is parallel with and immediately under the burners. I also provide a cold air supply pipe 31 within the burner chamber and located immediately below the pipe 25, and it has a number of openings 30 on the upper side and is controlled by a valve 32.

The compressed air from the pipe 25 passes into the cylinder 11 where it is warmed and thence passes to the pipe 25 and out to the burners. This is the main feature of my invention and contributes mostly to the improved quality and increased amount of lamp black which I have obtained by this mechanism. However, in order to control and modulate the temperature and quality of air supplied by the burners, the pipe 31 is used and the volume of cold air therefrom is regulated and cut off by the valve 32.

The cylinders 11 on which the carbon is deposited are parallel and carbon collecting hoppers 40 and 41 are provided in connection with said cylinders with the upper ends of the hoppers adjacent said cylinders and with brackets 42 in said hoppers carrying long scraping plates 43 that bear against the peripheries of said cylinders to that the carbon is scraped off from the surface of the cylinders and falls into the hoppers. The hoppers are contracted at their lower ends and discharge into a tube 44 from which it is conveyed by a screw conveyer 45 to some receptacle outside of the machine. The hopper 41 serves two cylinders 11 so that the lamp black from both cylinders falls into the same hopper.

The fumes from the burners pass upward and first strike against the inclined plates 50 and pass upward between the upper edges of said plates and then they meet an A-shaped plate 51 which causes the fumes to pass downward on each side between the plates 50 and 51 around the lower edges of the plate 51 and thence upward against the roof-plates 52 and out through the top 53. In making this circuitous passage an increased amount of carbon will be deposited on the plates 50, 51 and 52 and they are all so inclined and set that the carbon from them will be discharged and drop down into the hoppers 40 and 41. The top 53 is provided with a slide-damper 54 coöperating with a perforated plate 55 for controlling the draft.

What I claim as my invention and desire to secure by Letters Patent is:

1. A lamp black machine including a closed chamber, means therein upon which carbon is deposited, fuel burners immediately under said depositing means, and means for introducing warm air below said burners.

2. A lamp black machine including a closed chamber, a cylinder therein on which carbon is deposited, fuel burners under said cylinders, means for passing air through said cylinder and discharging the same in said chamber under said burners.

3. A lamp black machine including a closed casing, a revolving cylinder therein on which the lamp black is deposited, a series of fuel burners under said cylinder, a pipe leading to one end of said cylinder through which air may be introduced under pressure, and a pipe leading from the other end of said cylinder into said casing under said burners with outlet openings.

4. A lamp black machine including a closed chamber, a cylinder therein on which carbon is deposited, fuel burners under said cylinders, means for passing air through said cylinder and discharging the same in said chamber under said burners, and a valve-controlled perforated cold air pipe in said casing under said warm air pipe.

In witness whereof, I have hereunto affixed my signature in the presence of the witnesses herein named.

WILLIAM H. DAVIS.

Witnesses:
U. G. PIERCE,
GEO. W. HOOVER.